A. P. STITZEL.
METHOD OF FREEING FERMENTED MASH AND THE LIKE FROM NOXIOUS ODORS AND FLAVORS.
APPLICATION FILED NOV. 18, 1909.
956,650. Patented May 3, 1910.
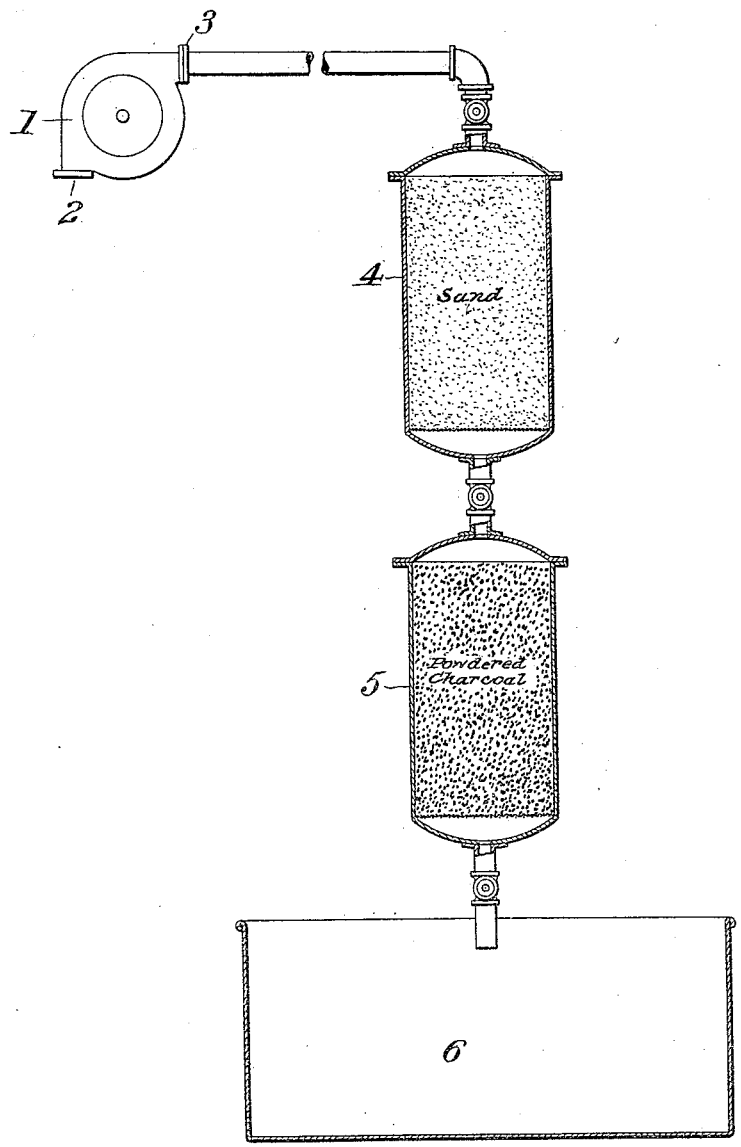

UNITED STATES PATENT OFFICE.

ARTHUR PHILIP STITZEL, OF LOUISVILLE, KENTUCKY.

METHOD OF FREEING FERMENTED MASH AND THE LIKE FROM NOXIOUS ODORS AND FLAVORS.

956,650.  Specification of Letters Patent.  Patented May 3, 1910.

Application filed November 18, 1909. Serial No. 528,744.

*To all whom it may concern:*

Be it known that I, ARTHUR PHILIP STITZEL, a citizen of the United States, residing at Louisville, in the county of Jefferson and State of Kentucky, have invented a certain new and useful Improvement in Methods of Freeing Fermented Mash and the Like from Noxious Odors and Flavors, of which the following is a full, clear, and exact description.

The object of this invention is to eliminate, prior to distillation, the noxious odors and flavors produced in the fermentation of the mash and pomace or cider used in liquor distillation, so as to obtain a distillate free from taint. I have found that this object may be very advantageously and effectively obtained if the fermented fluid mass is filtered, under pressure, first through sand, or other suitable filtering medium capable of freeing it from the particles of mash and yeast, and then through powdered charcoal, or such other filtering material as is capable of mechanically absorbing the noxious odors and flavors caused through fermentation; and my invention consists in a method or process of freeing fermented mash and the like, prior to distillation from such noxious odors and flavors by forcing it first through means adapted to arrest the particles of mash and yeast, and then through means capable of mechanically absorbing the odors and flavors, all as I will proceed now particularly to set forth and claim.

In order the better to understand my invention, I would state that the commonly practiced process of distilling whisky, brandy and spirits, consists in introducing the fermented mash, pomace or cider directly into the distilling apparatus, without any treatment thereof to remove the noxious odors and flavors contained therein, and consequently these odors and flavors pass along with the vapors and are absorbed by such vapors, and condensed along with the vapors, thereby imparting their disagreeable features to the liquor.

In the manufacture of spirits, the high wines, as they are called, resulting from the distillation of the fermented mash, are forced through charcoal to partially free such high wines from the noxious odors and flavors, and then distilled at a high proof strength. But as the boiling in the distillation of fermented mash, pomace or cider, fixes these odors and flavors in the high wines, it is necessary in order to obtain a clean spirit, to use only the middle part of the run of the redistilled high wines. The first and last parts are drawn off by themselves and are sold as alcohol, because the flavors and odors remain therein, and cannot be gotten rid of. By my method of freeing, before distillation, the fermented mash, pomace or cider, all of these noxious odors and flavors are eliminated, and the entire run will produce clean spirits, and the commodity which is sold as alcohol is not produced. Consequently, the price of spirits being greater than alcohol, by being able to produce all spirits, said spirits are produced at a lower cost.

The invention is not limited to any particular apparatus, but for sake of illustration, I have shown in the accompanying drawing, in elevation and partial section, an arrangement of apparatus that will answer, the illustration showing the mechanism conventionally.

A rotary pump 1, of any suitable character, has its inlet 2 connected with the vessel (not shown) containing the fermented mash, pomace or cider, and its outlet 3 is connected with the top of a filter 4, containing sand, or other filtering medium which will arrest or filter out the particles of mash, yeast and such solids as may be carried over by the pump, and thus avoid the clogging of the odor and flavor-absorbing medium. This filter 4 discharges into another, and, if desired, similar, filter 5, containing powdered charcoal, or such other filtering medium as will absorb, mechanically or otherwise, the noxious odors and flavors produced by the fermentation of the mash, pomace or cider. The thus filtered liquid is discharged from filter 5 into any suitable tank or vessel 6, whence it is drawn to the still for distillation in any approved way.

What I claim is:—

1. The method of freeing fermented mash and the like for distilled liquors, from noxious odors and flavors prior to distillation, consisting in forcing the fermented liquor first through a medium capable of taking up its solid particles and then through an odor and flavor-absorbing medium.

2. The method of freeing fermented mash and the like for distilled liquors, from noxious odors and flavors prior to distillation, which consists in pumping the fermented material through sand and thereby removing its solid particles, and thence pasing the strained liquid through powdered charcoal.

3. The method of distilling whisky, brandy and spirits, which consists in freeing the fermented mash, pomace or cider, prior to distillation, from noxious odors and flavors contained therein, by forcing the fermented liquor first through a medium capable of taking up its solid particles and then through an odor and flavor-absorbing medium and finally distilling the thus purified liquor in any approved way.

In testimony whereof I have hereunto set my hand this 17th day of November A. D. 1909.

ARTHUR PHILIP STITZEL.

Witnesses:
MARY HURST,
ROBERT TROMPETER.